INVENTOR
DANIEL AUGUSTUS STEVENS

ATT'YS.

3,430,072
SAMPLE AND HOLD CIRCUIT

Daniel A. Stevens, Severn, Md., assignor, by mesne assignments, to the United States of America as represented by the Secretary of the Navy
Filed Jan. 11, 1966, Ser. No. 520,312
U.S. Cl. 307—250                     3 Claims
Int. Cl. H03k 17/30, 5/20

This invention relates to an electronic sample and hold circuit, and more particularly to a circuit which can sample a waveform for a short period of time and produce a direct current (DC) output which is accurately proportional in amplitude and of a much longer duration than the sampling time.

Prior to this invention the function of sampling a waveform and storing a proportional voltage was performed by various circuits, the most common of which was a gating circuit in connection with a boxcar detector. The principal disadvantage of the boxcar detector in relation to this invention is the inaccuracy produced by capacitor discharge. The disadvantages of the various other circuits include the use of relays and complex diode gating circuitry which necessitates isolation between the sample signal and the gate. Relays are generally less reliable and of relatively large size, while isolation for diode gates sometimes requires transformers which are also of relatively large size.

It is a general object of this invention to provide a compact electronic circuit which samples a waveform and produces a DC voltage of long duration which is very accurately proportional in amplitude to the sampled waveform. Various other objects and advantages will appear from the following description of the invention, and the novel features will be particularly pointed out hereinafter in connection with the appended claims.

Figure 1:
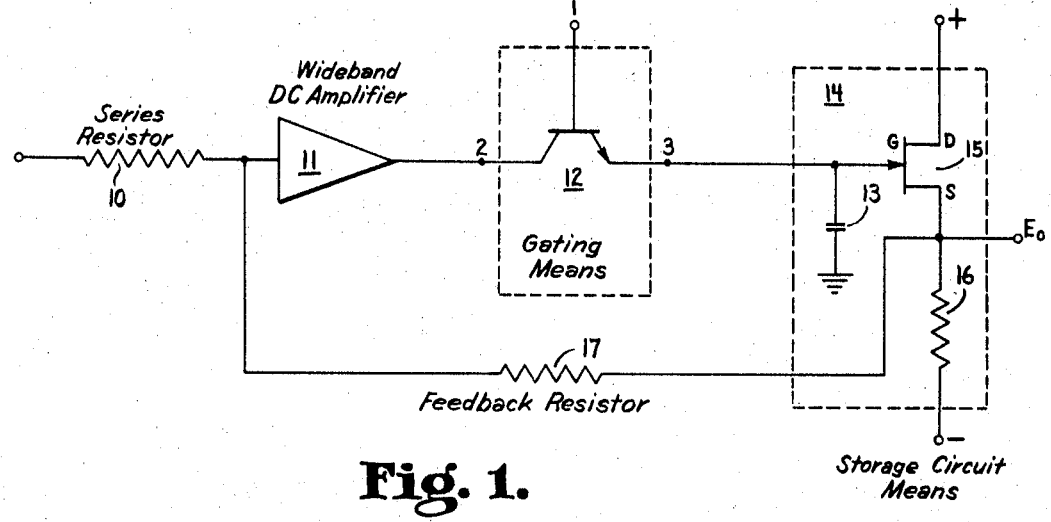
Figure 2:
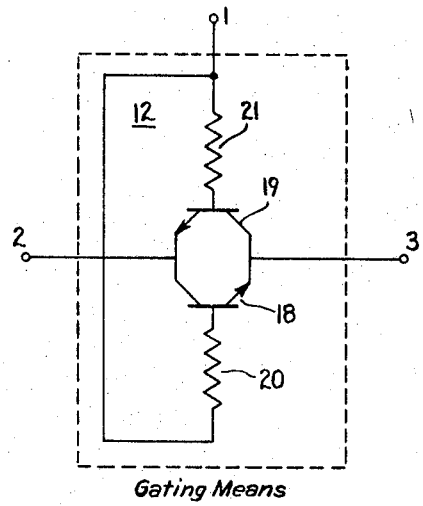

FIGURE 1 of the drawings is a combined schematic and block diagram which will be an aid in understanding the invention; and FIGURE 2 is one variation of FIGURE 1 which variation would be used for situations where the sampling time must be very short.

In the embodiment of the invention illustrated in FIGURE 1, one lead of a series resistor 10 is coupled to a video waveform source (not shown), and the other lead is coupled to the input of a wideband DC amplifier 11 having 180 degrees of phase shift from input to output. The series resistor 10 may be chosen to match the impedance of the video waveform source to the impedance of the invention. The output of the DC amplifier is coupled to the second terminal 2 of a three terminal gating means 12 which operates as an electronic switch. The illustrated gating means 12 is a transistor of the chopper variety (it will conduct in either direction) and the second terminal 2 is the collector electrode. The first terminal or control electrode 1 of the transistor receives gating pulses which close the electronic switch 12 allowing the sampled signal to pass to an output circuit. The duration of the gating pulse determines how long the electronic switch 12 remains closed and this period is equal to the sampling time. The third terminal 3 or emitter of the gating means 12 is coupled to one lead of a capacitor 13 which stores the energy coupled through the gating means 12 during the sampling time. The other lead of the capacitor 13 is connected to a point of ground potential. The capacitor is part of a storage circuit means 14 having the capacitor 13, a field effect transistor (FET) 15, and a load resistor 16. When the gating pulse is over, the electronic switch 12 opens and the capacitor 13 cannot discharge in that direction due to the high impedance of the "off" transistor. Therefore, the only discharge of the capacitor 13 through the gating means 12 is due to leakage current. The emitter of the gating means 12 is also coupled to the gate G of the FET 15. The input impedance to a FET is on the order of $10^{15}$ ohms and therefore it can be seen that the capacitor 13 cannot discharge rapidly in this direction either. The drain electrode D of the FET 15 is coupled to a positive source of power and the source electrode S is coupled through the load resistor 16 to a negative source of power. The voltage at the source electrode S is $E_0$, and this is the output signal of the circuit. One lead of a feedback resistor 17 is also coupled to the FET source electrode S and the other lead of the feedback resistor is coupled to the input of the DC amplifier, thus providing negative feedback for stability.

The value of the capacitor 13 is chosen by compromising between the storage time and the size requirements. The storage time is limited by the current leakage from the capacitor and assuming a reasonable value of leakage into the "off" transistor and the FET gate, to be $10^{-8}$ amps, and assuming a voltage drift rate of 10 mv./sec. to be permissible, then $$C = \frac{10^{-8} \text{ amps}}{10 \text{mv./sec.}} = 10^{-6} \frac{\text{amp-sec.}}{\text{volt}} = 1\mu f$$

Another design requirement is that the amplifier 11 must be capable of completely charging the capacitor 13 during the sample period. The required amplifier, as described herein, is well known in the art.

FIGURE 2 illustrates one variation of the embodiment shown in FIGURE 1. This variation is necessary when the sample time is required to be very short; for example, .5$\mu$ second. The gating means 12 here is comprised of two high speed transistors instead of the chopper transistor of FIGURE 1 which generally should not be used when the sampling time is below 10 $\mu$ seconds. In FIGURE 2 the transistors in the gating means are coupled in a complementary manner, with the collector of transistor 18 coupled to the emitter of transistor 19 to form terminal 2 of the gating means, and the collector of transistor 19 and the emitter of transistor 18 coupled together to form terminal 3 of the gating means. The gating means must be capable of passing current in either direction so that the capacitor 13 can be charged or discharged, during the sampling time, to correspond to a rise or fall of the sampled waveform from one sample time to the next. One lead of a resistor 20 is coupled to the base of transistor 18, and one lead of a resistor 21 is coupled to the base of transistor 19. The opposite leads of these resistors are tied together as terminal 1 of the gating means for connection to the gating pulse source. When working with very short sample times the amplifier 11 cannot be permitted to saturate if its recovery time is longer than the sample time. This can be prevented in the design of the amplifier or by means of Zener diode arrangements across the amplifier.

In the operation of the invention a gating pulse is applied to the control electrode 1 of the gating means. This permits the capacitor to charge toward the amplifier output voltage and it causes the FET to conduct, developing a voltage across the load resistor 16. This voltage, $E_0$, is fed back to the input of the DC amplifier and, therefore, a comparison is made between the voltage $E_0$ and the voltage being sampled, thereby causing the circuit to stabilize. After the circuit has stabilized and the capacitor has fully charged, the gating pulse is removed and the voltage $E_0$ remains constant for a long period of time compared to the duration of the sampling time. This occurs because the output voltage $E_0$ is dependent on the voltage at the gate G of the FET, which voltage remains constant since the capacitor discharge current is very small. When the next gating pulse arrives, the output voltage adjusts up or down as required in correspondence to the new sampled voltage. The circuit is capable of this voltage adjustment because the gating means 12 permits current to flow in either direction. This circuit provides a great advance, making possible storage-time to sample-time ratios of $10^7$ with errors of less than 2%.

It will be understood that various changes in the details, which have been herein described and illustrated in order to explain the nature of the invention, may be made by those skilled in the art within the principle and scope of the invention and I desire to be limited only in the scope of the appended claims.

I claim:
1. An electronic sample and hold circuit which samples a voltage waveform for a short period of time and stores a proportional direct current (DC) voltage for a much longer time, comprising:
   a series resistor having one lead adapted to be coupled to a voltage waveform source;
   a wideband DC amplifying means having input and output means, said input means coupled to the other lead of said series resistor;
   a gating means, which functions as an electronic switch, having three terminals, the first said terminal is an input terminal which receives gating pulses and controls said electronic switch to its open and closed conditions, and the second said terminal is coupled to said output means of said DC amplifying means;
   a storage circuit means, having a capacitor, a load resistor, and a field effect transistor having a source electrode, a drain electrode, and a gate electrode, said gate electrode being coupled to one lead of said capacitor and to the third of said three gating means terminals, the opposite lead of said capacitor being coupled to a point of ground potential, said drain electrode being coupled to a first voltage source, said source electrode being coupled to one lead of said load resistor and constituting an output of said sample and hold circuit, and the opposite lead of said load resistor being coupled to a second voltage source of opposite polarity to said first voltage source; and
   a feedback resistor being coupled between said source electrode and said input means of said DC amplifying means, whereby the voltage waveform is amplified and sampled for a period of time determined by the gating pulse, during which time said capacitor is charged and after which time said electronic switch is opened thereby locking the voltage at said gate of said field effect transistor at a constant value for a long time, and whereby said feedback resistor enables the circuit to stabilize during the closed period of said electronic switch.

2. An electronic sample and hold circuit which samples a voltage waveform for a short period of time and stores a proportional DC voltage for a much longer time as set out in claim 1 wherein
   said gating means is comprised of a chopper transistor and said first terminal is a base electrode, said second terminal is a collector electrode, and said third terminal is an emitter electrode.

3. An electronic sample and hold circuit which samples a voltage waveform for a short period of time and stores a proportional DC voltage for a much longer time as set out in claim 1 wherein
   said gating means is comprised of a first transistor, a second transistor, a first resistor, and a second resistor, said first resistor having one lead coupled to the base electrode of said first transistor and having the other lead coupled to one lead of said second resistor, the other lead of which is coupled to the base of said second transistor, the junction of said first resistor and said second resistor serving as said first terminal of said gating means and receiving gating pulses for controlling said electronic switch, the emitter of said first transistor and the collector of said second transistor being coupled together to serve as said second terminal of said gating means, and the emitter of said second transistor and the collector of said first transistor being coupled together to serve as said third terminal of said gating means whereby said first and second transistors are chosen for their high speed characteristics when it is required that the sample time be very short.

References Cited

UNITED STATES PATENTS

| | | | |
|---|---|---|---|
| 2,728,857 | 1955 | Sziklai | 307—250 |
| 2,840,707 | 1958 | Johnson | 328—151 |
| 3,280,386 | 10/1966 | Philips | 307—242 |
| 3,363,113 | 1/1968 | Bedingfield | 328—151 |
| 3,375,501 | 3/1968 | McCutcheon | 328—151 |

ARTHUR GAUSS, *Primary Examiner.*

HAROLD DIXON, *Assistant Examiner.*

U.S. Cl. X.R.

328—151